United States Patent [19]

Schaefer

[11] 4,188,102

[45] Feb. 12, 1980

[54] MIRROR REFLEX CAMERA WITH ELECTRONIC RANGEFINDER

[75] Inventor: Klaus-Dieter Schaefer, Braunfels, Fed. Rep. of Germany

[73] Assignee: Ernst Leitz Wetzlar GmbH, Wetzlar, Fed. Rep. of Germany

[21] Appl. No.: 917,249

[22] Filed: Jun. 20, 1978

[30] Foreign Application Priority Data

Jul. 9, 1977 [DE] Fed. Rep. of Germany ....... 2731192

[51] Int. Cl.$^2$ .................. G03B 3/10; G03B 13/06; G03B 13/16
[52] U.S. Cl. .................................... 354/25; 354/155; 354/166
[58] Field of Search ................. 354/25, 163, 152, 155, 354/166; 250/201

[56] References Cited

U.S. PATENT DOCUMENTS 3,781,110  12/1973  Leitz et al. ................. 354/163 X
3,953,728   4/1976  Leitz et al. ................. 354/25 X Primary Examiner—Michael L. Gellner
Attorney, Agent, or Firm—Gilbert L. Wells

[57] ABSTRACT

A mirror reflex camera having a pentaprism and an electronic rangefinder is improved by displacing the viewer axis by an angle up to 5° downward with respect to the optical axis of the picture taking lens. This is accomplished by modifying the pentaprism to have a fully specular concave mirror (7b) at the lower edge of the exit surface of pentaprism (7) and by selecting the angular dimensions of the pentaprism (7) so that the viewer axis (8a) deviates by an angle beta up to 5° downward with respect to the optical axis (8) which is horizontal in the ordinary operational position of the camera, and by having ocular (6) offset upward and so slanted with respect to its position when the optic axis (8) is horizontal that the ocular axis (6a) subtends an angle alpha up to 5° with the optic axis (8).

2 Claims, 2 Drawing Figures

MIRROR REFLEX CAMERA WITH ELECTRONIC RANGEFINDER

CROSS REFERENCE TO A RELATED APPLICATION

Applicant claims priority under 35 USC 119 for application P 27 31 192.8 filed July 9, 1977 in the Patent Office of the Federal Republic of Germany.

BACKGROUND OF THE INVENTION

The present invention relates to a photographic mirror reflex camera comprising a rangefinder, where a photoelectric detection system is mounted behind a grating acting as a spatial frequency filter in a focusing plane of the image taking objective within the rangefinder, the output signals from the detection system providing information about the degree of focus of the objective on the object being aimed at.

The state of the art of such rangefinding systems in mirror reflex cameras is described for instance in U.S. Pat. No. 3,953,728, the disclosure of which is incorporated herein. The essential characteristic of this kind of system is that the beam required for focusing is reflected through the pentaprism by specular means mounted therein and out its exit toward a grating located in front (as seen in the direction of the object), and onto a photoelectric detection system.

U.S. Pat. No. 3,953,728 discloses two kinds of specular means, namely fully reflecting mirrors mounted laterally at the beam exit surface, and a partially reflecting mirror extending at the same site across the entire beam exit surface.

However, both kinds of specular means have limitations. Thus the laterally mounted fully reflecting mirrors cover only two diametrically opposite partial regions of the exit pupil, and the full surface partially transmitting mirror sensibly decreases viewer brightness and contrast. Further, an observer's eye is reflected by this specular surface and the energy output for the photoelectric detection system is decreased.

SUMMARY OF THE INVENTION

Having in mind the limitations of the prior art it is an object of the present invention to cover more than two diametrically opposite partial regions of the exit pupil.

Another object of the present invention is to avoid the decrease in viewer brightness and contrast resulting from the full surface partially transmitting mirror of the prior art.

Yet another object of the present invention is to avoid having an observer's eye mirrored by the specular surface.

These objects are achieved in the present invention by providing the pentaprism with a fully specular concave mirror at its lower edge of its exit surface, further by so selecting the angular dimensions of the pentaprism that the new viewer axis subtends downward an angle beta up to 5° with respect to the viewer axis in the prior art cameras, which is substantially parallel to the optical axis of the picture taking lens, i.e. horizontal in the normal picture taking position of the camera, and that the ocular is so offset and slanted upward with respect to its position when the viewer axis is horizontal that the ocular axis subtends an angle alpha up to 5° with respect to the said old viewer axis.

In order to achieve the objects of the present invention the angles alpha and beta are varied between about 0-5 degrees, up to about 5 degrees each and preferably between 1.5 and 4 degrees.

The invention therefore is based upon the concept of geometrically splitting the beams into rays going to the ocular and those going to the photoelectric detection system. This beam splitting is achieved by slightly offsetting the two paths of these rays. Consequently one part each of the objective's exit pupil, asymmetric with respect to the objective axis, is used for the viewer and the other for the photoelectric detection system. Thereby a maximum of light can be supplied both to the viewer and to the photoelectric detection system.

If the dimensions of the viewer eyepiece of such a camera is assumed to be typically 10×15 mm, then the application of the concept of the invention in particular to objectives with f/numbers exceeding 4.5 is at once feasible because the 15 mm diameter exit pupil is larger than the viewer eyepiece.

BRIEF DESCRIPTION OF THE DRAWING

An embodiment of the present invention is shown in the drawing, wherein.

DESCRIPTION OF THE PREFERRED EMBODIMENT

Figure 1:
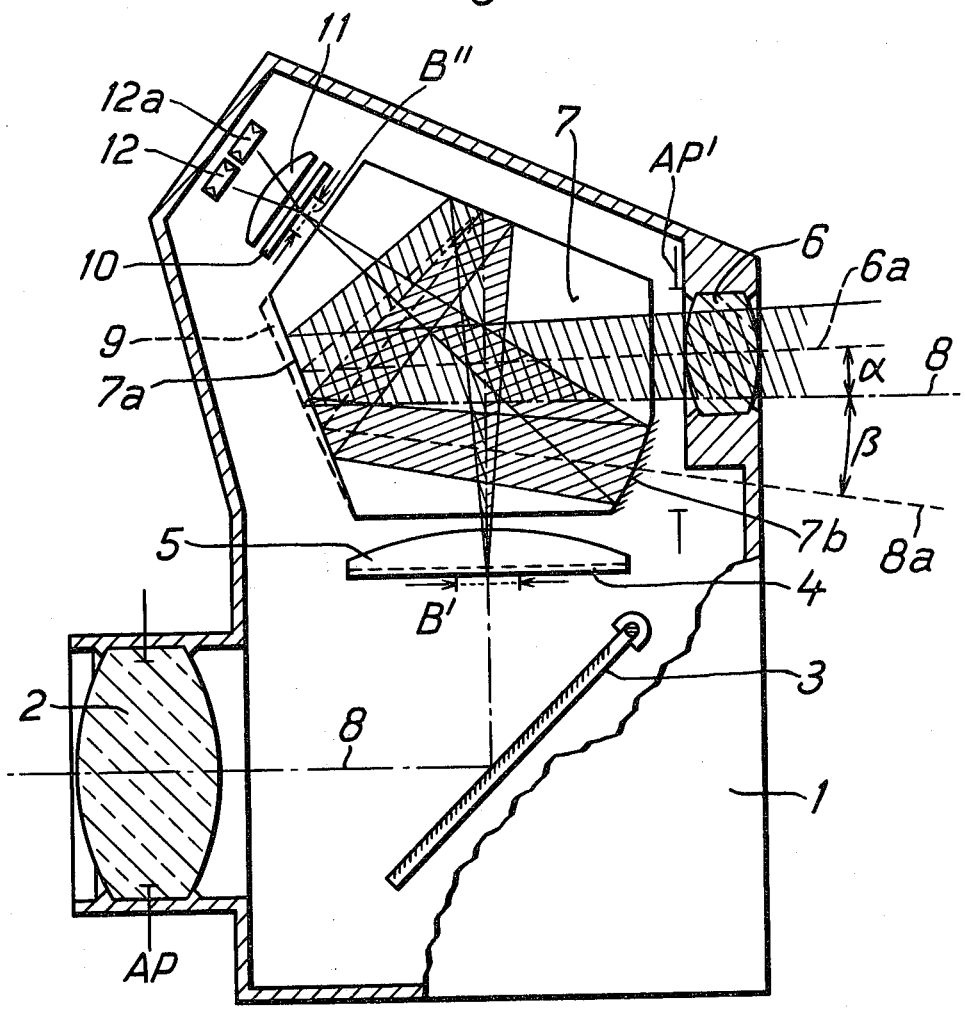
FIG. 1 is a side view of a schematic partial cross section showing of the mirror reflex camera with a pentaprism modified and mounted according to the invention.

FIG. 1 shows in schematic form a housing 1 of a mirror reflex camera. The camera is provided with an objective 2 and a reflex mirror 3. A focusing screen 4 of one piece with a field lens 5 is located above the reflex mirror. However, when desired, the focusing screen and the field lens may also be constructed as separate components as disclosed in U.S. Pat. No. 3,953,728. An image of the object (omitted) is reproduced by objective 2 on focusing screen 4.

The user looks by means of ocular 6 acting as a magnifier at the object image, through pentaprism 7. The dimensions of the pentaprism in cameras of the prior art such as U.S. Pat. No. 3,953,728 are selected so that the optical axis 8 of objective 2 following two reflections in the pentaprism issues as axis 8 essentially offset from and parallel to its path in objective 2 but exiting at the rear of camera housing. Ocular 6 in such prior art cases is mounted so that its optical axis coincides with the optical axis 8 exiting the objective. Ordinarily that part of the objective or ocular axis passing through the pentaprism of the prior art follows approximately the dash-dotted line 8.

The camera of the present invention shown in FIG. 1 further comprises an electronic rangefinder of which the essential component is a grating 10 operating as a spatial frequency filter and which is followed by a field lens 11 and a photoelectric detection system consisting of photodetectors 12, 12a. The operation of such a range finder is without significance to the present invention, and is described in detail for instance in U.S. Pat. Nos. 3,781,110 and 3,953,728. It should be merely noted here that grating 10 moves perpendicularly to the plane of the drawing, for instance in oscillatory manner, and that the two photodetectors 12, 12a of the photoelectric detection system are shown in FIG. 1 as rotated by 90° for the sake of greater clarity. In actuality of two photodetectors are located one behind the other perpendicularly to the plane of the drawing.

The functioning of the rangefinder nowever requires that an image of the object appearing on focusing screen 4 be reproduced on grating 10.

However, an image of B' must be simultaneously visible also in ocular 6. Therefore, the beam issuing from image B' must be divided. This is performed in the present invention by geometric beam splitting, that is by dividing the pupil.

To that end, the front reflection surface 7a of pentaprism 7 is slightly tilted clockwise with respect to the prior art surface 9 shown in dashed lines and the rear lower edge of the pentaprism 7 is rounded into a concave mirror 7b and made fully specular. By these steps the image AP' of exit pupil AP of objective 2 projected into the ocular plane by field lens 5 is thereby offset somewhat downward, and the new viewer axis 8 now passes along line 8a, directed to the centre of concave mirror 7b at the rear lower edge of pentaprism 7.

Ocular 6 simultaneously is offset slightly upward and tilted. Therefore, the rays from the part of the pupil directed by way of the upper transparent part of the pentaprism 7 will all reach the ocular, while the rays from the other pupil part directed by way of the concave mirror 7b at the lower edge of pentaprism 7b and reflected therefrom will all be incident on grating 10. FIG. 1 shows the paths of these rays for a point image of B' which is the central image point. This geometric beam splitting ensures optimal brightness both for the ocular (viewer) and for the photoelectric detection system.

The user will fail to be aware of the slight offset position of the ocular and slant of the ocular axis 6a with respect to the normally horizontal viewer axis 8 provided the angle alpha between these two axes does not exceed a given magnitude of about 5°. The axis of the beam incident on grating 10 then deviates likewise by a certain angle from the old viewer axis 8. This has no effect on the rangefinder system. These angles alpha and beta being much exaggerated in FIG. 1 for the sake of greater clarity.

Figure 2:
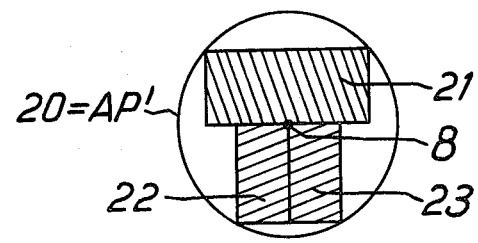
FIG. 2 is a schematic elevation of the exit pupil of the picture taking objective showing the pupil division.

Those regions on which the beams to the ocular and to grating 10 are incident are shown in image AP' of exit pupil AP in FIG. 2. The circle 20 represents the image AP' of exit pupil AP. Reference numeral 21 denotes the region "seen" through by the ocular and numerals 22, 23 denote that region of the pupil through which finally the rays reach photodetectors 12, 12a respectively.

It should be noted that the exact magnitude of the angles alpha and beta may vary to a large extent and depend mainly on the diameter of the image AP' of the exit pupil AP of the picture taking lens. Further, the dimension of the pentaprism has a decisive effect. If a more voluminous pentaprism can be accepted—in view of the overall size of the camera—then the angles alpha and beta may be larger. Tests have proven, however, that angles of about 5° each are the limit that will be tolerated by the viewer.

I claim:

1. In a mirror reflex camera having a pentaprism having a beam exit surface and means for generating a viewer axis, a picture taking objective with a horizontal optical axis offset in parallel from its original path by multiple reflections in said pentaprism, a grating acting as a spatial frequency filter, an electronic range finder including a photoelectric detection system, an object image projected by said picture taking objective through said pentaprism by mirror means mounted at the beam exit surface of said pentaprism onto said grating, said grating located in the focal plane of said mirror means and preceding said photoelectric detection system, the improvement wherein said mirror means comprises a fully specular concave mirror (7b) provided at the lower edge of the exit surface of said pentaprism (7) and comprising means for deviating said viewer axis (8a) of a beam issuing from said object image by an angle up to 5° downward with respect to said horizontal optical axis (8) onto said fully specular concave mirror (7b) and deviating another beam issuing from said object image onto the transparent part of the rear surface of said pentaprism and an ocular (6) with an axis offset upward from said deviated viewer axis and slanted so that the ocular axis (6a) subtends an angle up to 5° with respect to said horizontal axis (8) of said deviated viewer axis.

2. The mirror reflex camera of claim 1, wherein said pentaprism has a first surface for entry of said projected object image, a second surface for reflecting said object image from said first surface, a third surface for reflecting said object image from said second surface, a fourth surface for transmitting a first portion of said object image from said third surface along said ocular axis and a fifth surface for transmitting a second portion of said object image from said fully specular concave mirror to said photoelectric detection system, said first and third surfaces having an angle therebetween defining said means for deviating.

* * * * *